United States Patent [19]
Tokushige et al.

[11] 3,804,684
[45] Apr. 16, 1974

[54] PROCESS FOR MANUFACTURING A COMPOSITE FOAMED SYNTHETIC RESIN EXTRUDATE HAVING AN OUTER HARD SURFACE LAYER AND AT LEAST ONE HARD INTERLAYER

[75] Inventors: Kenichi Tokushige, Tokyo; Toru Segawa, Kawasaki; Kiminori Uda, Yokohama; Hideho Tada, Chigasaki; Teisuke Ando, Yokohama; Hiroya Yamamoto, Kawasaki; Noburo Hashimoto, Yokohama, all of Japan

[73] Assignee: Showa Denko K.K., Tokyo, Japan

[22] Filed: Jan. 27, 1971

[21] Appl. No.: 110,188

[30] Foreign Application Priority Data
Mar. 13, 1970 Japan.............................. 45-20855

[52] U.S. Cl................... 156/60, 156/78, 156/324, 161/161, 161/247, 264/48, 264/95, 264/321, 264/DIG. 14, 425/392
[51] Int. Cl....................... B29d 27/00, B32b 31/02
[58] Field of Search............ 264/47, 48, 210 R, 321, 264/DIG. 14; 156/303, 324, 77, 78, 198, 60, 324; 425/463, 464, 392; 161/160, 161, 247

[56] References Cited
UNITED STATES PATENTS

| | | | |
|---|---|---|---|
| 3,363,034 | 1/1968 | Noland | 264/321 |
| 3,415,913 | 12/1968 | Lux | 264/48 |
| 3,391,051 | 7/1968 | Ehrenfrennd | 264/48 X |
| 3,516,886 | 6/1970 | Anackenbush | 264/210 R |
| 3,317,363 | 5/1967 | Weber | 264/48 X |
| 3,426,111 | 2/1969 | Simpson | 264/48 |
| 3,560,600 | 2/1971 | Gliniecki | 264/48 |
| 3,238,565 | 3/1966 | Jacobs | 264/321 X |
| 3,525,125 | 8/1970 | Berger | 264/48 |
| 3,311,681 | 3/1967 | Cherney | 264/321 X |
| 3,670,059 | 6/1972 | Winstead | 264/48 |
| 3,213,071 | 10/1965 | Campbell | 161/160 UX |
| 3,322,870 | 5/1967 | Sacks | 264/95 |
| 3,557,265 | 1/1971 | Chisholm et al. | 161/160 UX |
| 3,558,755 | 1/1971 | Laban et al. | 264/95 |
| 3,578,549 | 5/1971 | Cleereman | 161/160 |
| 3,726,743 | 4/1973 | Reifenhauser et al. | 264/95 X |
| 3,758,354 | 9/1973 | Sakurai et al. | 264/95 X |
| 3,194,864 | 7/1965 | Richie | 264/53 X |

Primary Examiner—Philip E. Anderson
Attorney, Agent, or Firm—Kemon, Palmer & Estabrook

[57] ABSTRACT

Foamed synthetic resin extrudate and the process and equipment for manufacture thereof, comprising forming a melted body of foamable and thermoplastic synthetic resin in an extruder, extruding said body into a tubular body through one or plural dies under atmospheric pressure, forcibly cooling the surface layer of said tubular body to suppress the foaming in the cooled portion and to allow foaming in the other portion and deforming under pressure said tubular body before it loses plasticity.

4 Claims, 12 Drawing Figures

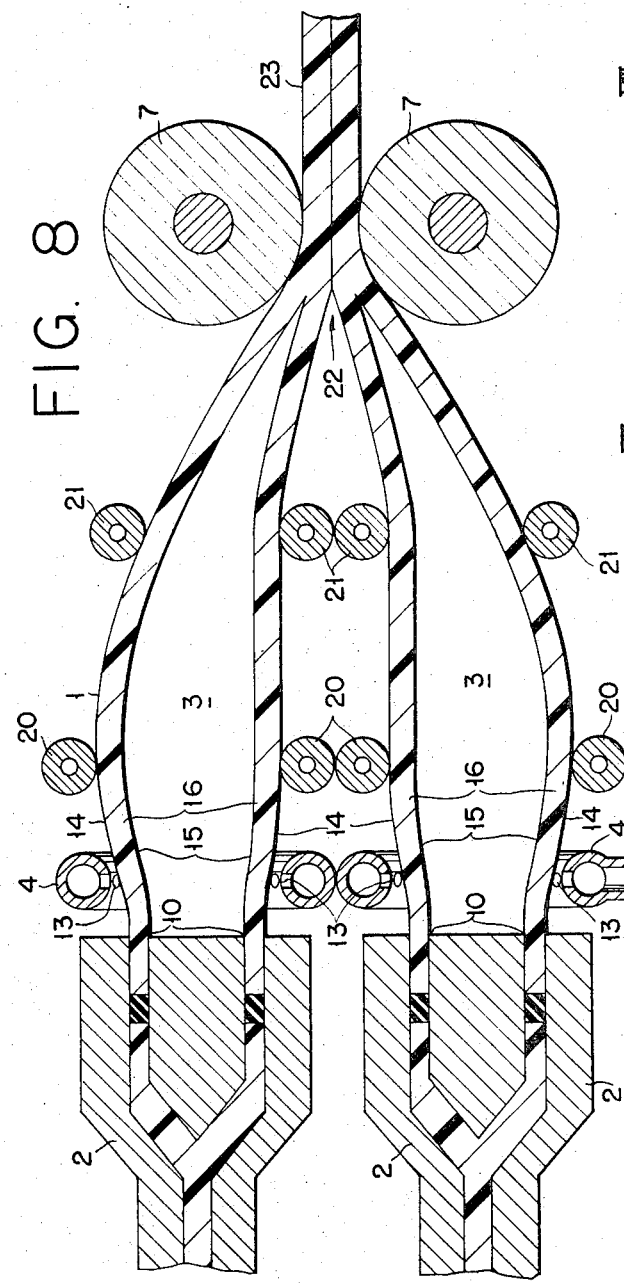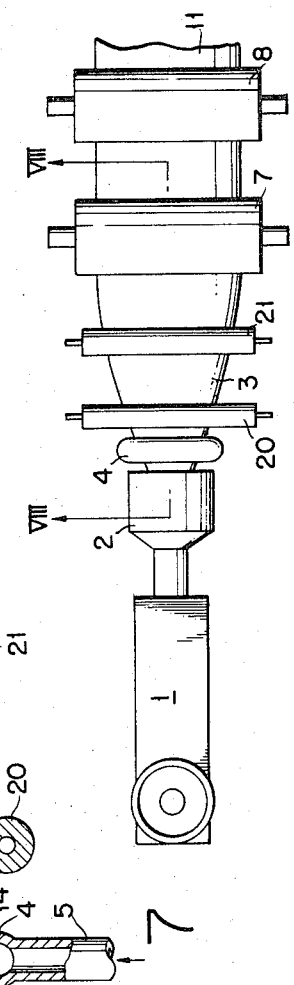

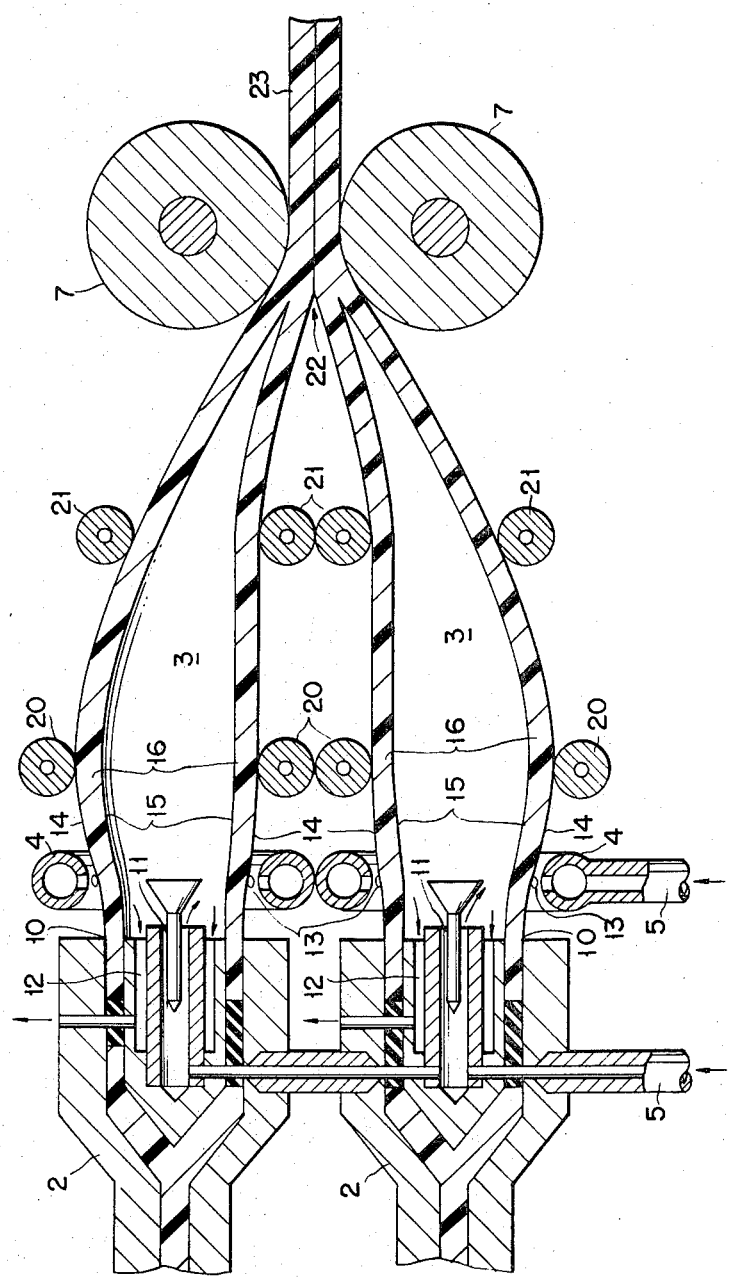

PROCESS FOR MANUFACTURING A COMPOSITE FOAMED SYNTHETIC RESIN EXTRUDATE HAVING AN OUTER HARD SURFACE LAYER AND AT LEAST ONE HARD INTERLAYER

BACKGROUND OF THE INVENTION

This invention relates to a process for manufacturing from foamed synthetic resin extrudate a continuous body of plate, pillar, or rod having beautiful appearance and being heat insulating, sound and shock absorbing to some extent, particularly to a synthetic wood, i.e., a material substitutable for wood in the field of architecture, furniture making, or packing.

In recent years, foamed synthetic resin products substitutable for wood have tentatively been manufactured, but no products are yet found to perfectly satisfy the requirements for a substitute wood such as mechanical property, i.e., tensile strength, compressive strength, rigidity, surface hardness, etc., application of nails or wood screws, and a beautiful appearance.

SUMMARY OF THE INVENTION

The present invention has for its object to provide extruded bodies of foamed synthetic resin having beautiful appearance dense, hard, smooth, and lustrous surface as well as excellent mechanical strength satisfactorily substitutable for wood. The present invention is a process for manufacturing foamed synthetic resin extrudate having hard layers in the surface and central portions, characterized by forming a melted body of foamable synthetic resin in an extruder, extruding said body into a tubular body through a die having an annular nozzle, forcibly cooling the surface portion of said tubular body to suppress the foaming in the cooled portion and to allow foaming in the other portion, and deforming under pressure said tubular body before it loses plasticity.

The products obtained in accordance with this invention have hard layers in the surface and central portions which contribute to high hardness on the surface and good mechanical strength; the products, owing to this property, may be cut with saws and fastened with nails, wood screws etc., being satisfactorily substituted for wood. The products may be colored at will and the apparent specific gravity is generally equal to or less than that of wood, and the desired apparent specific gravity will be obtained wholly or locally in the product by changing the quantity of the blowing agent and the degree of cooling. The interior portion of an extruded body of foamed synthetic resin consists of foamy substance; and the product is therefore heat insulating, sound and shock absorbing to some extent, and widely useable as material for building, packing, etc.

BRIEF DESCRIPTION OF THE DRAWINGS

FIG. 7 is a plan view of the equipment shown in FIG. 6;

FIGS. 8 and 9 are both cross-sectional views on line VIII—VIII of FIG. 7, FIG. 8 illustrating the operation performing the second embodiment and FIG. 9 illustrating the operation performing the third embodiment;

DESCRIPTION OF THE PREFERRED EMBODIMENTS

Figure 1:
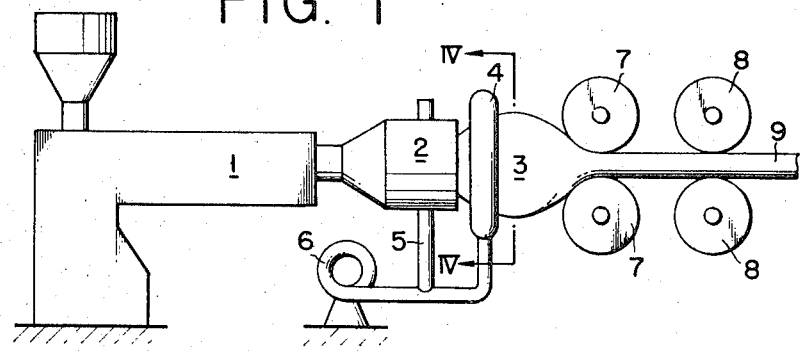
FIG. 1 is a side view illustrating the operation of an equipment used in a first embodiment of this invention.

The present invention will be explained in detail referring to the drawings.

Figure 2:
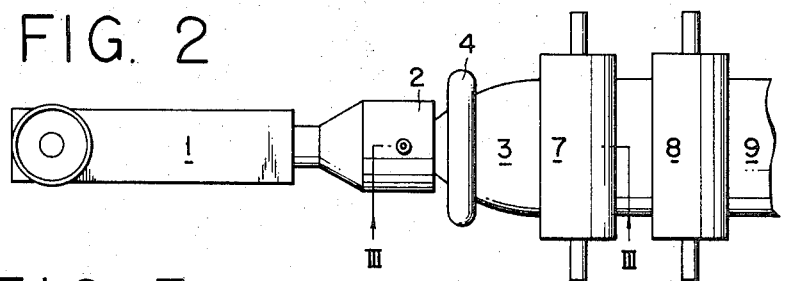
FIG. 2 is a plan view of the equipment shown in FIG. 1.

FIGS. 1 to 5 explain the first embodiment of the present invention. In FIGS. 1 and 2, the reference numeral 1 denotes an extruder, 2 a die, 3 a tubular body of synthetic resin which is extruded and foaming, 4 a cooling ring for cooling the outside surface layer of said tubular body, 5 an air supply pipe for cooling the inside surface layer of said tubular body, 6 a blower for supplying cooling air, 7 and 8 molding rolls, and 9 a foamed synthetic resin plate, i.e., a product.

Figure 3:
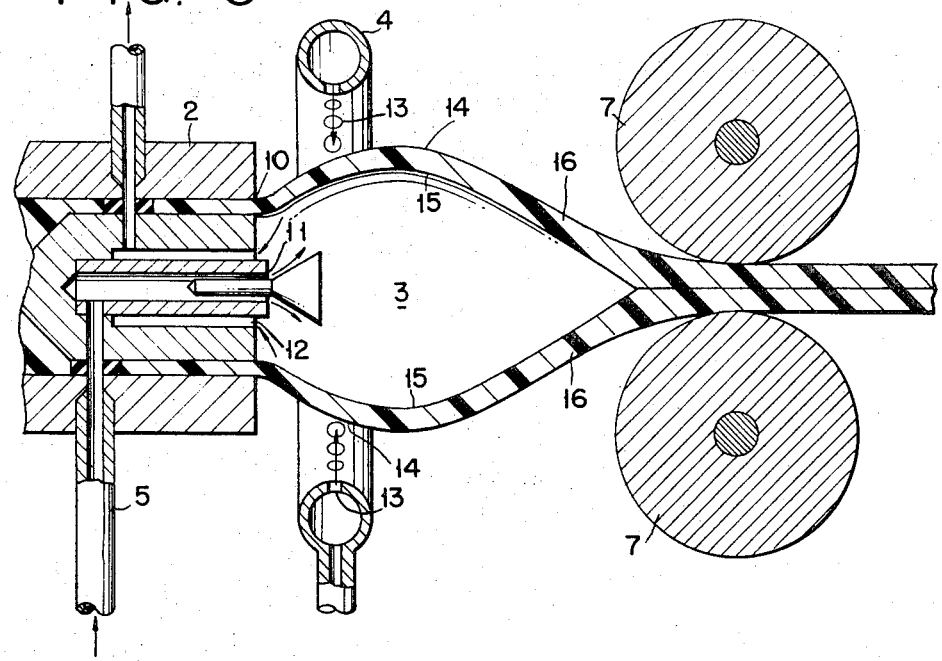
FIG. 3 is a cross-sectional view on line III—III of FIG. 2.
Figure 4:
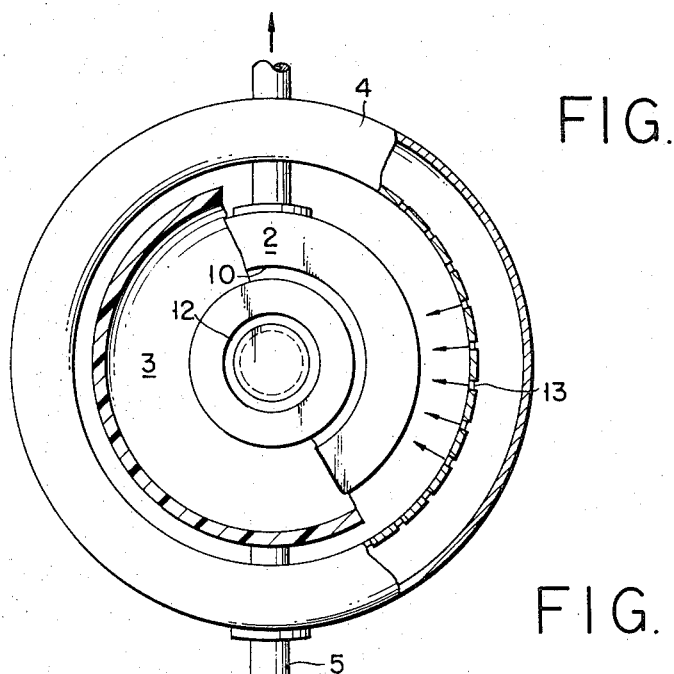
FIG. 4 is a cross-sectional view on line IV—IV of FIG. 1.

FIG. 3 is a cross-sectional view in detail taken on line III-III of FIG. 2. FIG. 4 is the cross-sectional view in detail taken on line IV—IV of FIG. 1, i.e., a front view showing, partly in section, the die 2 and the outside cooling ring 4. The die 2 has an annular nozzle 10 which is provided inside with an air jetting opening 11 for cooling the inside surface layer of the tubular body and an air outlet opening 12; the cooling ring 4 is provided with numerous air jetting holes 13 for cooling the outside surface layer of the tubular body, all of said air jetting holes being connected to the blower 6 for supplying cooling air.

The synthetic resin material melted in the extruder 1 and in a foamable state is extruded through the annular nozzle 10 of the die 2 into a tubular body 3, and starts foaming; the outside surface portion 14 of the tubular body 3 is cooled by air jetted from the air jetting holes 13 provided in the outside cooling ring 4 to suppress the foaming in the outside surface portion 14, while the inside surface portion 15 is cooled by air from the cooling air jetting opening 11 provided in the die to suppress the foaming in the inside surface portion 15 and the interior portion 16 alone is allowed to foam and forms a foamy body. However, the cooling over the inside surface portion 15 of the tubular body 3 is restricted to such degree that the inside surface portions 15, 15 can adhere to each other.

Subsequently, the tubular body 3 is forcibly deformed by rolls 7 and 7 before the tubular body 3 as a whole loses plasticity, so that the inside surface 15 of the tubular body is adhered to form a plate of a predetermined thickness. Said plate is further cooled and shaped by rolls 8 and 8 to obtain a plate body 9.

Figure 5:
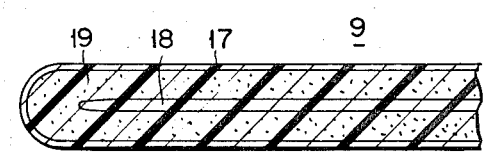
FIG. 5 is a cross-sectional view illustrating an extruded body of foamed synthetic resin manufactured in the first embodiment of this invention.

FIG. 5 shows the cross-section of a synthetic resin plate 9 obtained in the above process. The surface 17 of the plate 9 is composed of the foaming suppressed outside surface portion 14 of the tubular body 3 and therefore is dense, smooth, and lustrous. The central portion of the plate 9 is composed of the inside surface layer 15 of the tubular body adhered while the foaming is suppressed, serving as the core body 18 of a hard layer. The intermediate part between the surface 17 of the plate and the core body 18 is composed of the interior portion 16 of tubular body 3 and therefore is full of foamy body 19.

In the above-mentioned first embodiment, an example is shown wherein an extruder having one die is used, and the second and third embodiments described in the following are examples wherein an extruder provided with a plurality of dies is used.

Figure 6:
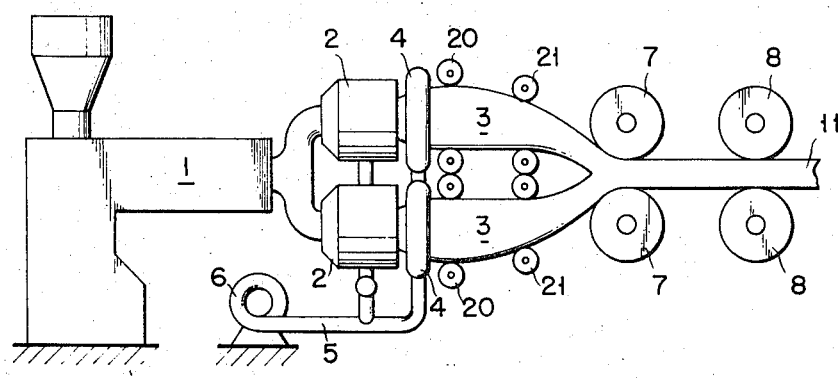
FIG. 6 is a side view illustrating the operation of an equipment used in a second and third embodiment of this invention.

To explain the second embodiment of this invention according to FIGS. 6 to 8, synthetic resin material melted in an extruder 1 and in a foamable state is continuously extruded through annular nozzles 10, 10 of two dies 2, 2 into tubular bodies 3, 3 and starts foaming. The outside surfaces of the tubular bodies are cooled by air jetting from numerous air jetting holes 13 provided in the outside cooling rings 4, 4 so that the foaming is suppressed in the outside surface portions 14 while the inside surface portions 15 and the interior portions 16 foam and become foamy bodies because said portions are not cooled. Two tubular bodies 3, 3 are thereafter continuously compressed by guide rolls 20 and 21 roughly into plates before they lose plasticity; subsequently, the inside surface layers 15, 15 and the contact surface 22 between two tubular bodies 3, 3 are adhered to form one body of plate form 23, i.e., a product.

Figure 10:
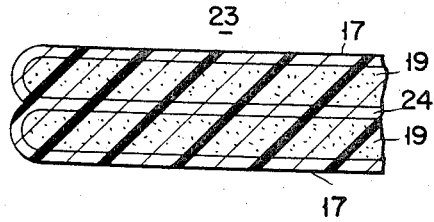
FIG. 10 is a cross-sectional view illustrating an extruded body of foamed synthetic resin manufactured in the second embodiment of this invention.

FIG. 10 shows the cross-section of a foamed synthetic resin plate 23 obtained according to the second embodiment. The foaming suppressed outside surface portions 14 of tubular bodies 3 form the surfaces 17 of plate 23 and also a hard core body 24 in the middle of the plate 23; the intermediate portion between said surface 17 and core body 24 consists of the interior portion 16 of the tubular bodies 3, being full of foamy bodies 19.

The number of extruded tubular bodies in said second embodiment is not limited to two as shown in the figure but may be more than two. In case thermoplastic synthetic resin material different in kind and/or color is employed as extruded synthetic resin material, the inherent property or color of each material can be well developed in the products.

Now referring to FIGS. 6, 7 and 9, the third embodiment of this invention will be explained in the following. The synthetic resin material melted in an extruder 1 is continuously extruded through annular nozzles 10, 10 of two dies 2, 2 into tubular bodies 3, 3; said tubular bodies 3, 3 are cooled from both inside and outside surfaces simultaneously, respectively, by air jetting from numerous air jetting holes 13 of cooling rings 4, 4 for cooling the outside surface portions 14 and by air jetting holes 11 for cooling the inside surface portions 15 of tubular bodies 3. The foaming in the outside surface portions 14 and the inside surface portions 15 of the tubular bodies 3 is thus suppressed, while the interior portions 16 of tubular bodies 3 foam and become foamy since the interior portions are not cooled. Subsequently, in the same manner as in the second embodiment, two tubular bodies 3, 3 are compressed roughly into plate-form bodies by guide rolls 20 and 21 before the tubular bodies lose plasticity, and then adhered by rolls 7, 7 and 8, 8 to form a plate-form body 23.

Figure 11:
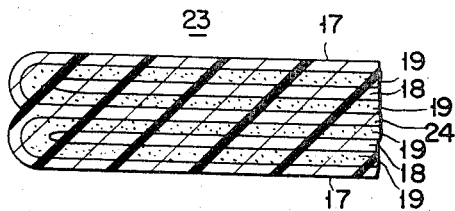
FIGS. 11 and 12 are cross-sectional views of extruded bodies of foamed synthetic resin manufactured in the third embodiment of this invention.

FIG. 11 is the cross-sectional view of a foamed synthetic resin plate 23 manufactured in the third embodiment of this invention. The outside surface portions 14 of the tubular bodies 3, where foaming is suppressed by cooling, form a surface portion 17 and a hard core body 24 in the central portion of the plate 23; and the inside surface portions 15 of the tubular bodies 3, where the foaming is suppressed by cooling, form the other hard core bodies 18.

The intermediate portions between said hard cores are filled with foamy bodies 19.

Figure 12:
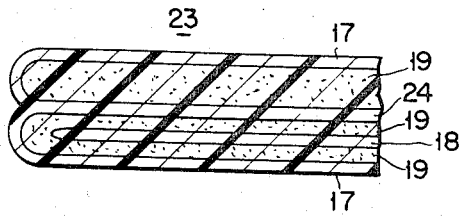

If only one of the tubular bodies is cooled from the inside of the tubular body in the third embodiment, there is obtained a product having the sectional structure including hard core bodies 24 and 18 respectively in the central portion and in one side alone as shown in FIG. 12, and this product has high mechanical strength comparable to the product shown in FIG. 11.

It is also possible in the third embodiment as in the case of the second embodiment to increase the number of tubular bodies to more than two and to employ materials different in composition and/or color.

The synthetic resin material usable in this invention includes all thermoplastic materials from which foamed bodies are produced by extrusion; for example, general purpose polystyrene, high impact polystyrene, styrene-acrylonitrile copolymer, acrylonitrile-butadiene-styrene inter-polymer, polymethyl-methacrylate, polyvinyl chloride, polyethylene, or polypropylene.

As blowing agents may be used such substance as azodicarbonamide, dinitrosopentamethylenetetramine, p-toluen-sulfonyl hydrazide, sodium bicarbonate, or combination of citric acid and sodium bicarbonate which decomposes or reacts to liberate gas by heating, or volatile liquid like petroleum ether. It is necessary, however, that foaming is suppressed by such moderate cooling as not to solidify the resin. It is also preferable that such a blowing agent foams at a relatively high temperature so as to homogenize the foam. The blowing agent must properly be selected depending upon the temperature at which the resin is extruded. To reduce and homogenize the size of foam or to color and extend, additives such as plasticizer, lubricant, powder of inorganic substance like calcium carbonate or talc, etc. may be added to the resin whenever occasion arises.

In the invention under the present application, products of various sections like L- or T-shape, in addition to plate-form products as shown in the drawing, or products having uneven surfaces may be obtained by properly selecting molding rolls when such products are necessary. Also according to this invention, various materials such as plywood, plastic sheet, and metal foil may be applied to a tubular body on one or both sides, interposed between the tubular bodies and formed while the tubular body is extruded and deformed; thus composite products of said various materials and the foamed body are obtained. Further, products having foam locally to different degree may be obtained by changing the quantity of a blowing agent in the second and third embodiments.

In this invention, the more vigorously the tubular body is cooled, the more severely the foaming is suppressed. The cooling of the tubular body may be controlled depending on the surface condition and mechanical strength desired for the product, so far as the contacting surfaces of the tubular products can adhere to each other during molding into one body. Also by locally controlling the cooling, there may be obtained such products that the surface is very hard or the internal core is very hard although the surface is not very hard. Needless to say, the tubular body may be cooled by other means than air blowing.

In case that continuous body required as a product is a relatively narrow plate or rod, it may be obtained by first manufacturing a wide plate and then cutting in the longitudinal direction, but the cutting with saw exposes the foamed portion, spoiling the external appearance and decreasing the strength. It is therefore preferable in such case to cut the plate continuously with rolls provided with edge-tools before the plate solidifies completely during molding. According to this method, any plate or rod is covered over all the surface with the earlier formed not-foamed layer and the obtained product is excellent in external appearance and strength.

As for die used in this invention, a circular die shown in the drawing is easy to make and use; however, it is recommended in the case of manufacturing wide products to adopt an elliptical form or other appropriate form. In case that plural dies are used as in the second and third embodiments, dies may be different in size.

The examples of this invention will be described in detail as follows:

EXAMPLE 1

Using the equipment shown in FIG. 3, a dry blend of 100 weight parts of general purpose polystyrene and 1 weight part of dinitrosopentamethylenetetramine (blowing agent) was extruded under the condition that the cylinder temperature was from 100° to 140° C and the melted resin temperature in the die was from 90° to 110° C, and the formed tubular body was cooled by blowing air from the outside and the inside thereof and deformed into a plate-form body by rolls, drawing it at a velocity of 1 meter per minute.

The obtained product was a white plate 70 mm wide and 6 mm thick with dense surface and had a sectional structure shown in FIG. 5, the apparent specific gravity being 0.6.

EXAMPLE 2

Using the equipment shown in FIG. 8, general purpose polystyrene containing 8 percent petroleum ether (blowing agent) mixed with a small quantity of citric acid, sodium bicarbonate, and yellow pigment, was extruded under the condition that the temperature of the extruder cylinder was from 125° to 130° C and the melted resin temperature in the die was from 100° to 105° C, and two molded tubular bodies were cooled by blowing air from the outside and deformed thereof into a plate-form body by rolls, drawing it at a velocity of 1 meter per minute.

The obtained product was like a wooden plate 70 mm wide and 10 mm thick, and had a sectional structure shown in FIG. 10.

EXAMPLE 3

Using the equipment shown in FIG. 9, a dry blend of 50 weight parts of general purpose polystyrene pellet, 50 weight parts of high impact polystyrene pellet, and one weight part of azodicarbonamide as a blowing agent, was extruded under the same condition as the preceding example, and two molded tubular bodies were cooled by blowing air from the outside and the inside thereof and deformed into a plate-form body by rolls, drawing it at a velocity of 1 meter per minute.

The obtained product was 70 mm wide and 10 mm thick as was the preceding example, and had a sectional structure shown in FIG. 11.

Specimens of 70 mm in length were taken from the three products of Examples 1 to 3 and tested to determine the mechanical strength and foaming ratio. For the purpose of comparison, plate-form bodies obtained by extruding as in Example 2 and forming unaccompanied by forced cooling were put to the same test.

The result of such test is shown in a table. The values measured for Japan cedar (67 mm thick) are also listed in the table for reference.

Table

|  | Example 1 | | Example 2 | | Example 3 | |
| --- | --- | --- | --- | --- | --- | --- |
|  | Trans-verse | Longi-tudinal | Trans-verse | Longi-tudinal | Trans-verse | Longi-tudinal |
| Bending strength kg/cm$^2$ | 120 | 70 | 133 | 80 | 400 | 201 |
| Modulus of bending elasticity 10$^3$ kg/cm$^3$ | 1.8 | 1.4 | 2.6 | 1.7 | 14.5 | 8.3 |
| Breaking load kg | 115 | 66 | 125 | 74 | 373 | 187 |
| Compressive strength kg/cm$^2$ | — | 70 | — | 80 | — | 230 |
| Missile impact strength kg.cm | 52 | | 60 | | 80 | |

Table —Continued

| | Example 1 | | Example 2 | | Example 3 | |
|---|---|---|---|---|---|---|
| | Trans-verse | Longi-tudinal | Trans-verse | Longi-tudinal | Trans-verse | Longi-tudinal |
| Bending strength ratio (longitudinal to transverse) | 0.58 | | 0.60 | | 0.50 | |
| Foaming ratio | 5.0 | | 5.0 | | 1.8 | |
| Surface Condition | flat, smooth heavy yellow | | flat, smooth heavy yellow | | flat, smooth | — |

| | Specimen for comparison | | Japan cedar | |
|---|---|---|---|---|
| | Trans-verse | Longi-tudinal | Trans-verse | Longi-tudinal |
| Bending strength kg/cm² | 108 | 60 | 502 | 70 |
| Modulus of bending elasticity 10³ kg/cm² | 1.1 | 1.0 | 37 | — |
| Breaking load kg | 102 | 58 | — | — |
| Compressive strength kg/cm² | — | 64 | — | 277 |
| Missile impact strength kg.cm | 40 | | 25 | |
| Bending strength ratio (longitudinal to transverse) | 0.56 | | 0.14 | |
| Foaming ratio | 5.0 | | — | |
| Surface condition | rough surface light yellow | | — | |

What we claim is:

1. A process for manufacturing foamed synthetic resin extrudate having an outer hard surface layer and at least one inner hard surface layer, consisting essentially of
   a. forming a melted body of foamable thermo-plastic synthetic resin in an extruder, said synthetic resin being selected from the group consisting of polystyrene, styrene-acrylonitrile copolymer, acrylonitrile-butadiene-styrene copolymer, polymethylmethacrylate, polyvinyl chloride, polyethylene and polypropylene,
   b. extruding said melted body into a plurality of tubular bodies adjacent to each other through a plurality of dies having an annular nozzle,
   c. forcibly cooling the outside surface portion of each tubular body by blowing a gas thereon sufficiently to suppress foaming only in the cooled surface portion while leaving the surface thereof in a tacky condition and to allow foaming in the inner portion of each tubular body,
   d. and deforming said plural tubular bodies by rolling before losing plasticity thereof so that the inside surface portions of the plural tubular bodies are fused together and the plural bodies are fused together into an integral laminate.

2. A process for manufacturing foamed synthetic resin extrudate having an outer hard surface layer and a plurality of inner hard surface layers consisting essentially of
   a. forming a melted body of foamable thermo-plastic synthetic resin in an extruder, said synthetic resin being selected from the group consisting of polystyrene, styrene-acrylonitrile copolymer, acrylonitrile-butadiene-styrene copolymer, polymethylmethacrylate, polyvinyl chloride, polyethylene, and polypropylene,
   b. extruding said melted body into a plurality of tubular bodies adjacent to each other through a plurality of dies having an annular nozzle,
   c. forcibly cooling the outside surface portion and the inside surface portion of each tubular body by blowing air thereon sufficiently to suppress foaming only in the cooled surface portions while leaving the surfaces thereof in a tacky condition and to allow foaming in the inner portions of each tubular body,
   d. and deforming said plural tubular bodies by rolling before losing plasticity thereof so that the inner surface portions of the plural bodies are fused together and the plural bodies are fused together as an integral laminate.

3. The process of claim 2 wherein said melted body is polystyrene containing azodicarbonamide as a blowing agent.

4. The process of claim 2 wherein said melted body contains a blowing agent selected from the group consisting of azodicarbonamide, dinitrosopentamethylenetetramine, p-toluenesulfonyl hydrazide, sodium bicarbonate and mixtures of citric acid and sodium bicarbonate.

* * * * *